United States Patent
Long et al.

(10) Patent No.: US 11,687,488 B2
(45) Date of Patent: Jun. 27, 2023

(54) DIRECTORY DELETION METHOD AND APPARATUS, AND STORAGE SERVER

(71) Applicant: Huawei Technologies Co., Ltd., Shenzhen (CN)

(72) Inventors: Yin Long, Beijing (CN); Shengqian Jia, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 690 days.

(21) Appl. No.: 16/358,213

(22) Filed: Mar. 19, 2019

(65) Prior Publication Data

US 2019/0213171 A1    Jul. 11, 2019

Related U.S. Application Data (63) Continuation of application No. PCT/CN2016/106132, filed on Nov. 16, 2016.

(51) Int. Cl.
*G06F 16/16* (2019.01)
*G06F 3/06* (2006.01)
(Continued)

(52) U.S. Cl.
CPC ............ *G06F 16/162* (2019.01); *G06F 3/067* (2013.01); *G06F 3/0611* (2013.01);
(Continued)

(58) Field of Classification Search
CPC ...... G06F 16/162; G06F 16/13; G06F 3/0611; G06F 3/0623; G06F 3/0637; G06F 3/067; G06F 21/62
(Continued)

(56) References Cited

U.S. PATENT DOCUMENTS 8,738,857 B1    5/2014  Clark et al.
10,379,743 B1 *  8/2019  Gupta ................ G06F 21/6218
(Continued)

FOREIGN PATENT DOCUMENTS

CN       1609826 A      4/2005
CN      101282330 A    10/2008
(Continued)

OTHER PUBLICATIONS

Machine Translation and Abstract of Chinese Publication No. CN104991934, dated Oct. 21, 2015, 10 pages.
(Continued)

*Primary Examiner* — Hosain T Alam
*Assistant Examiner* — Nicholas E Allen
(74) *Attorney, Agent, or Firm* — Conley Rose, P.C.

(57) ABSTRACT

A directory deletion method and apparatus, and a storage server, where the directory deletion method includes receiving, by a storage server, a delete operation authentication request of a host, where the delete operation authentication request carries user information and information about a target directory, storing, by the storage server, the user information and returning a file identifier (FID) of the target directory to the host after authentication succeeds, sending, by the host to the storage server, a delete request carrying the FID, performing, by the storage server, verification on the file and the subdirectory using the user information, and deleting a successfully verified empty subdirectory and a successfully verified file. Hence, the directory deletion method and the apparatus, and the storage server improve directory deletion efficiency.

20 Claims, 3 Drawing Sheets

(51) Int. Cl.
G06F 16/13 (2019.01)
G06F 21/62 (2013.01)

(52) U.S. Cl.
CPC .......... G06F 3/0623 (2013.01); G06F 3/0637 (2013.01); G06F 3/0652 (2013.01); G06F 16/13 (2019.01); G06F 21/62 (2013.01)

(58) Field of Classification Search
USPC ........................................................ 707/821
See application file for complete search history.

(56) References Cited

U.S. PATENT DOCUMENTS

| | | | | |
|---|---|---|---|---|
| 2002/0161982 | A1* | 10/2002 | Riedel ..................... | H04L 29/06 711/170 |
| 2003/0225796 | A1 | 12/2003 | Matsubara | |
| 2009/0150460 | A1* | 6/2009 | McClanahan ......... | G06F 16/119 |
| 2010/0023491 | A1 | 1/2010 | Huang et al. | |
| 2014/0006354 | A1* | 1/2014 | Parkison ............... | G06F 16/172 707/661 |
| 2015/0006581 | A1 | 1/2015 | Luo | |
| 2015/0249618 | A1* | 9/2015 | Golander .............. | G06F 16/185 709/224 |
| 2015/0324386 | A1* | 11/2015 | Calder ................ | H04L 67/1097 707/649 |
| 2015/0339314 | A1* | 11/2015 | Collins ............... | G06F 16/1744 707/627 |
| 2015/0370845 | A1* | 12/2015 | Haustein ............... | G06F 16/119 707/690 |
| 2016/0072888 | A1* | 3/2016 | Jung ........................ | H04L 67/42 709/219 |
| 2016/0077757 | A1* | 3/2016 | Hasegawa ............. | G06F 3/0622 711/111 |
| 2017/0364355 | A1* | 12/2017 | Nitschke ............. | G06F 21/6218 |
| 2018/0018344 | A1* | 1/2018 | Kilaru ..................... | G06F 3/067 |
| 2018/0074747 | A1* | 3/2018 | Hasegawa ............. | G06F 3/0647 |
| 2018/0075053 | A1* | 3/2018 | Karr ....................... | G06F 3/0643 |
| 2018/0157860 | A1* | 6/2018 | Nair ..................... | G06F 21/6218 |
| 2018/0314433 | A1* | 11/2018 | Guo ........................ | G06F 3/067 |
| 2019/0213171 | A1* | 7/2019 | Long ..................... | G06F 16/162 |

FOREIGN PATENT DOCUMENTS

| | | |
|---|---|---|
| CN | 102821095 A | 12/2012 |
| CN | 103620616 A | 3/2014 |
| CN | 104980401 A | 10/2015 |
| CN | 104991934 A | 10/2015 |
| JP | 2004164555 A | 6/2004 |

OTHER PUBLICATIONS

Foreign Communication From A Counterpart Application, European Application No. 16921999.5, Extended European Search Report dated Aug. 29, 2019, 9 pages.
Foreign Communication From A Counterpart Application, Chinese Application No. 201680003122.3, Chinese Search Report dated Nov. 13, 2019, 2 pages.
Foreign Communication From A Counterpart Application, Chinese Application No. 201680003122.3, Chinese Office Action dated Nov. 22, 2019, 6 pages.
Machine Translation and Abstract of Chinese Publication No. CN1609826, dated Apr. 27, 2005, 12 pages.
Machine Translation and Abstract of Chinese Publication No. CN102821095, dated Dec. 12, 2012, 14 pages.
Machine Translation and Abstract of Chinese Publication No. CN104980401, dated Oct. 14, 2015, 20 pages.
Machine Translation and Abstract of Japanese Publication No. JP2004164555, dated Jun. 10, 2004, 33 pages.
Foreign Communication From A Counterpart Application, PCT Application No. PCT/CN2016/106132, English Translation of International Search Report dated Jul. 27, 2017, 2 pages.

* cited by examiner

DIRECTORY DELETION METHOD AND APPARATUS, AND STORAGE SERVER

CROSS-REFERENCE TO RELATED APPLICATIONS

This application is a continuation of International Patent Application No. PCT/CN2016/106132 filed on Nov. 16, 2016, which is hereby incorporated by reference in its entirety.

TECHNICAL FIELD

Embodiments of the present disclosure relate to computer technologies, and in particular, to a directory management technology.

BACKGROUND

With rapid development of computer technologies and network technologies, it is gradually difficult for a storage of a computer to meet various requirements such as high-speed access, large-capacity storage, and low costs. Therefore, a relatively independent storage system emerges. The storage system generally includes a storage device such as a storage server, has its own interface and protocol, and is connected to a computer host using a coaxial cable, a network cable, an optical fiber, or the like. Serving as a data storage center, the storage system provides a storage service for the computer host.

When a user deletes a directory in a network attached storage (NAS) server using a WINDOWS host, common operations of the user include selecting a directory that needs to be deleted, right-clicking a mouse to display a menu bar, and clicking a "delete" option in the menu bar.

The deletion behavior of the user is divided into two processes in the WINDOWS system. First, a client recursively traverses, using two command words, create and identify, a subdirectory structure of the directory that needs to be deleted, then, the client recursively uses, according to a directory structure level by level, a command word setinfo to set an attribute FILE_INFO/SMB2_FILE_DISPOSITION_INFO->Delete On Close for each subdirectory and each file. The host and the NAS server need to exchange information with each other for each time of setting. The NAS server determines a reference count of each file or empty directory. When the reference count is 0, the file or the empty directory can be deleted.

The host is generally relatively far away from the NAS server. Therefore, a specific time is required to exchange information between the host and the NAS server each time. More subdirectories and files in the to-be-deleted directory indicate more times of information exchange, and therefore, the user experiences a longer deletion time. The NAS server often stores a directory with a capacity of more than 1 terabyte (TB), and it may take tens of minutes or even hours to delete the entire directory. Such a low speed is unacceptable for a user.

SUMMARY

This application describes a directory deletion method, a directory deletion apparatus, and a storage server. Directory deletion efficiency can be improved using the technology provided in this application.

According to a first aspect, an embodiment of this application provides a directory deletion method, including sending, by a host, a delete operation authentication request to a storage server, where the delete operation authentication request carries user information and information about a target directory, receiving, by the storage server, the delete operation authentication request of the host, detecting the user information, and after detecting that a user represented by the user information has delete permission for the target directory, obtaining a file identifier (FID) of the target directory according to the information about the target directory, sending a success response message to the host, where the success response message carries the FID, and storing the user information, receiving, by the storage server, a delete request of the host, where the delete request carries the FID, and performing, by the storage server, retrieval using the FID, to identify the target directory, and performing a delete operation on a file and a subdirectory in the target directory, where the delete operation includes performing verification on the file and the subdirectory using the user information stored by the storage server, and deleting a successfully verified empty subdirectory and a successfully verified file. After all files and all directories in a non-empty directory are deleted, the non-empty directory is changed to an empty directory that can also be deleted. After the implementation is used, the storage server performs verification on the user information such that the storage server does not need to perform confirmation on the user information with the host when deleting each subfile or object. This shortens a time of an entire process, and reduces occupied resources and bandwidth.

In a first possible implementation of the first aspect, before sending a success response message, the method further includes, when it is detected that a delete flag is not set for the target directory, setting, by the storage server, a delete flag for the target directory. That the delete flag is set indicates that the target directory is waiting to be deleted. A resource waste caused by repeatedly performing a delete operation on a same target can be avoided by setting a delete flag. After the directory is deleted, the delete flag is also deleted.

In a second possible implementation of the first aspect, before sending a success response message, the method further includes, when detecting that a create operation flag is not set for the target directory, setting, by the storage server, a create operation flag for the target directory. That the create operation flag is set means that a current delete operation can be performed on the target directory, and another operation (such as a delete, write, or read operation) cannot be performed.

In a third possible implementation of the first aspect, the method further includes sending, by the storage server, a failure response message to the host after detecting that a create operation flag has been set for the target directory.

In a fourth possible implementation of the first aspect, performing, by the storage server, a delete operation on a file and a subdirectory in the target directory includes starting, by the storage server, multiple threads to execute the delete operation. Each thread may delete one file or one subdirectory, or each thread may delete multiple files or multiple subdirectories. The multiple threads are executed concurrently such that efficiency can be further improved. In the other approaches, confirmation with the host needs to be performed for each time of deletion. Therefore, files or subdirectories can be deleted only one by one, and cannot be deleted concurrently.

In a fifth possible implementation of the first aspect, the method further includes receiving, by the storage server, a next delete operation authentication request of the host, and when a directory or a file that the next delete operation authentication request requests to delete has been successfully deleted by the thread, feeding back, by the storage server, a response indicating that the directory or the file is not identified to the host.

In a sixth possible implementation of the first aspect, the user information is a user identifier (ID) or a user group ID.

In a seventh possible implementation of the first aspect, the storage server is a NAS server. In another aspect, the storage server may be another storage server, provided that the storage server is a file-based storage server.

According to a second aspect, an embodiment of this application further provides a directory deletion apparatus, including a transceiver module, an authentication module, and a deletion module. Functions of the modules correspond to the first aspect and the possible implementations of the first aspect.

According to a third aspect, an embodiment of this application further includes a storage server, including a processor and a storage medium. The processor may perform the method in the first aspect or the possible implementations of the first aspect. The storage medium may store data of a target directory.

DESCRIPTION OF EMBODIMENTS

Figure 1:
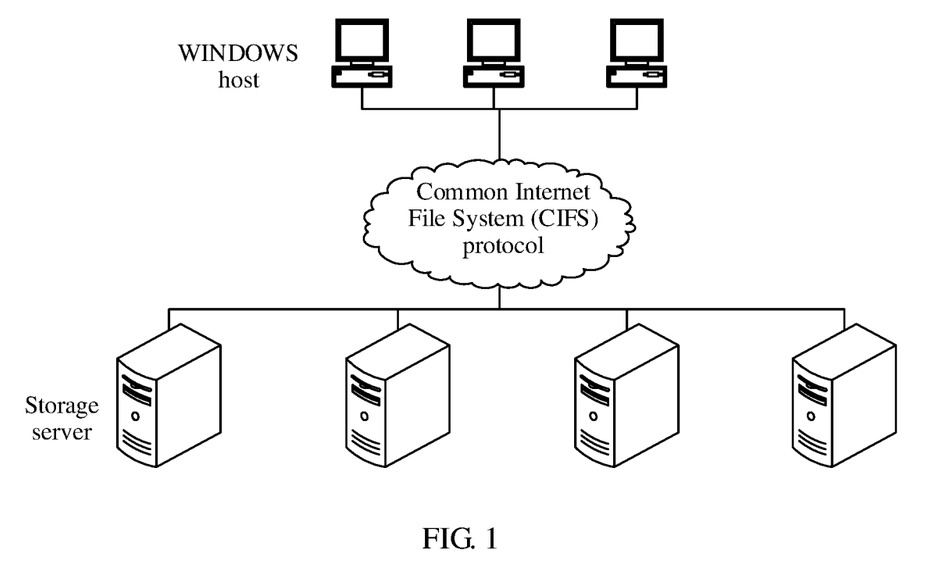
FIG. 1 is a topology diagram of an implementation of a storage system according to this application.

In a storage system shown in FIG. 1, a host communicates with a storage server. If the host requests to delete a directory, the storage server may locally store a user ID. When a subdirectory and a file in the directory need to be subsequently deleted, the storage server does not need to obtain the user ID from the host again, and can directly obtain the locally stored user ID to perform authentication. This can reduce times of data exchange between the host and the storage server. In an implementation, the data of the target directory is stored in a storage medium of the storage server. In another implementation, the storage medium is outside the storage server, and is managed by the storage server. The host may run the MICROSOFT WINDOWS operating system. The storage server is, for example, a NAS server. The host and the NAS server access each other using the Common Internet File System (CIFS) protocol.

According to a solution provided in embodiments of the present disclosure, a using habit of a WINDOWS user does not need to be changed, and no special application program needs to be installed on a user client, and meanings of command words in the CIFS protocol do not need to be changed. The NAS server identifies a flag for deleting an entire directory on a CIFS client, and concurrently and quickly deletes a subdirectory and a file in the directory in the background. This reduces an entire-directory deletion latency experienced by a user.

Figure 2:
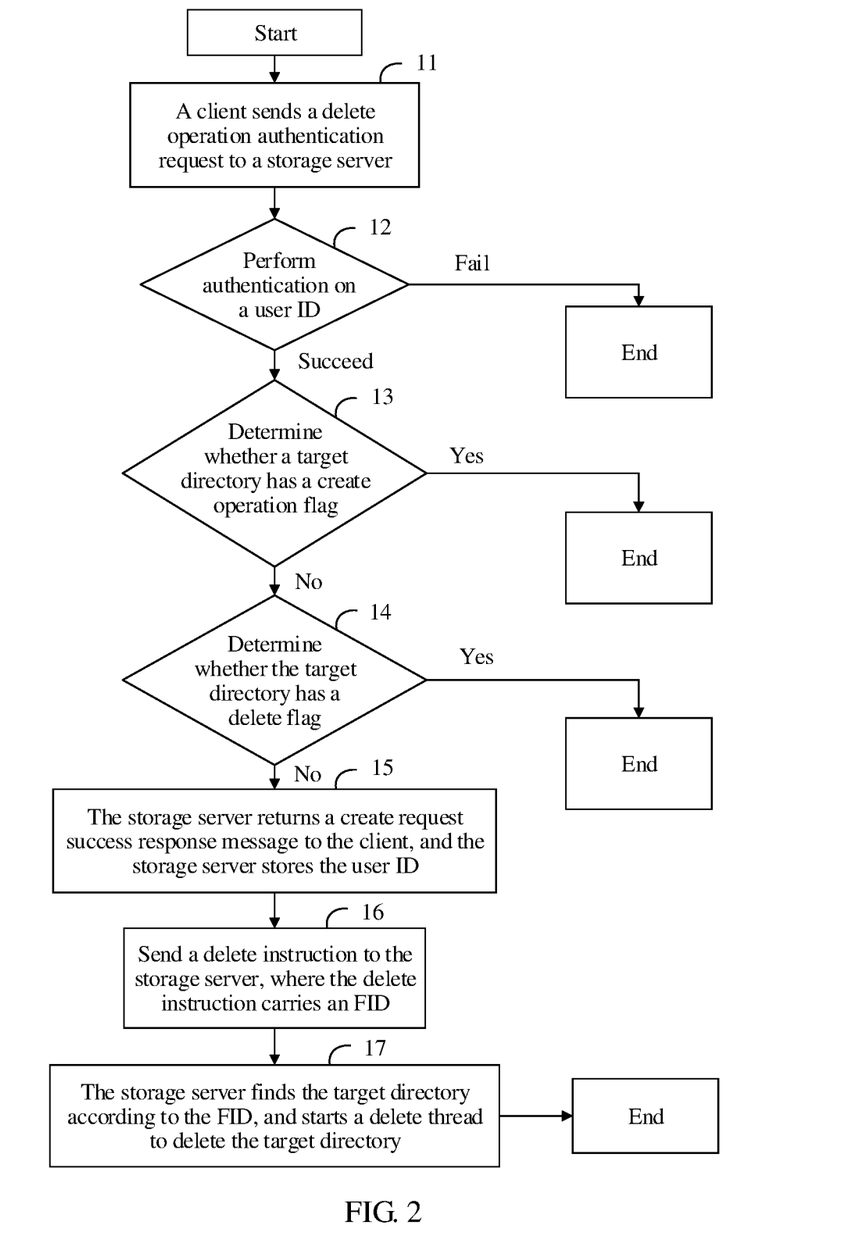
FIG. 2 describes a procedure embodiment of a directory deletion method according to this application.

Referring to FIG. 2, the following describes a procedure embodiment of a directory deletion method in the present disclosure.

Step 11: A client sends a delete operation authentication request to a storage server.

The delete operation authentication request may include user information and an operation object. An operation type is deletion. The user information is, for example, a user ID or a user group ID. For ease of description, the following uses the user ID as an example to describe this embodiment and subsequent embodiments. The operation object is directory information. The delete operation authentication request is used to request to confirm whether a user represented by the user ID (or a user group represented by the user group ID) has delete permission for the operation object. For ease of description, in this embodiment and subsequent embodiments, a directory that needs to be deleted is referred to as a target directory.

The directory information may identify a directory. The storage server may translate the directory information into an FID of the target directory.

The directory information includes a file name of the target directory and an FID of an upper-level directory of the target directory. For example, if a path of a target directory A is "1\2\3\A", directory information may be a combination of an FID of a path "1\2\3" and a directory name "A". After receiving the directory information, the storage server can obtain an FID of the target directory A by means of translation.

In addition, if the storage server records an FID corresponding to a path of each directory, the directory information also includes a path of the target directory, and the storage server translates the path of the target directory into the FID at a time. For example, if the path of the target directory A is "1\2\3\A", the directory information may be the path "1\2\3\A". After receiving the directory information, the storage server directly translates the path of the target directory into the FID of the target directory A.

Further, an operation type of the delete operation authentication request may be a create request. The create request is also referred to as a command word. The create request operation type may be used to "open" a directory or a file, and is an operation performed on the directory or the file before another operation. The create request carries an operation type field, and the operation type field describes an operation that needs to be performed. When "delete" is set to be valid in the operation type field, it indicates that a delete operation needs to be performed. In another scenario, in the operation type field, "create" may be set to be valid such that a create operation can be performed, or "read" is set to be valid such that a read operation can be performed, or "write" is set to be valid such that a write operation can be performed.

An operation of a host is performed by the client. The client may be a client supporting the CIFS protocol, and sends a create request using the CIFS protocol. The storage server may be a NAS server.

Step 12: After receiving the delete operation authentication request of the client, the storage server performs authentication on a user ID.

In this step, if authentication succeeds, it means that the user has permission to delete the target directory, and the storage server returns a create request success response message to the client. If authentication fails, it means that the user does not have delete permission, and therefore, the procedure ends.

Step 13: Optionally, determine whether a target directory has a create operation flag, and if the target directory has a create operation flag, end the procedure. That the target directory has a create operation flag means that the directory is in an "open" state and another operation is possibly being performed on the directory. If a delete operation is performed in this case, a conflict may occur with an operation that is being performed. Therefore, the target directory cannot be deleted. In this step, if the target directory does not have a create operation flag, a create operation flag is set for the target directory. After the create operation flag is set, operation permission for the target directory is suspended using the delete operation authentication request.

In this embodiment of the present disclosure, after the create operation flag is set for the target directory, a create operation flag is also set for a subdirectory in the target directory and a file (subfile) included in the target directory.

Step 14: Optionally, further determine whether the target directory has a delete flag, and if yes, end the procedure. That the target directory has a delete flag means that the target directory is being deleted or to be deleted using the method in this embodiment, and the operation of deleting the target directory this time does not need to be performed repeatedly.

Similarly, before the create request success response message is sent to the client, in this step, it is further determined whether any upper-level directory of the target directory has a delete flag, and if yes, the procedure ends. That the any upper-level directory of the target directory has a delete flag means that the any upper-level directory of the target directory is being deleted using the method in this embodiment. As a lower-level directory of the upper-level directory, the target directory also falls within a deletion range. Therefore, the operation of deleting the target directory this time does not need to be performed repeatedly.

It should be noted that step 13 and step 14 are optional. That is, there may be three execution manners: (1) If step 12 does not proceed to an end, proceed to step 15, (2) If neither step 12 nor step 13 proceeds to an end, proceed to step 15, (3) If none of step 12, step 13, and step 14 proceeds to an end, proceed to step 15. Step 12, step 13, and step 14 may be performed in any sequence.

In addition, optionally, after the create request success response message is returned to the client, a timer is started. Duration of the timer is, for example, one second. If a delete instruction of the client is not received within the one second, the delete flag that has been set is cleared, and the procedure ends.

Optionally, before the create request success response message is returned to the client, the delete flag is set for the target directory. Further, a correspondence between the target directory (for example, the FID of the target directory) and the delete flag may be recorded.

Step 15: The storage server returns a create request success response message to the client, and the storage server stores the user ID. The create request success response message carries the FID corresponding to the target directory. The storage server may store a correspondence between an FID and directory information. Therefore, the FID of the directory may be obtained according to the directory information of the target directory. Each directory corresponds to a unique FID. The FID may be used to uniquely identify a file or a directory, and a length of the FID may be, for example, 2 bytes or 4 bytes.

The user ID is stored in the storage server, for example, is stored in a memory of the storage server. Alternatively, the user ID may be stored in a built-in hard disk, a built-in solid-state drive, or an external hard disk of the storage server. In the other approaches, the storage server does not store the user information. If authentication fails, the procedure ends. A storage controller is also a type of the storage server described in this embodiment of the present disclosure. Certainly, the user ID may be stored before step 15. Further, the storage server is configured to store a correspondence between the user ID and the target directory (for example, the FID of the target directory). For example, a correspondence is established between the FID of the target directory and the path of the target directory. Therefore, the following case can be described. The user represented by the user ID has delete permission for the target directory. In addition, the storage server may further store a correspondence between the user ID and both a subdirectory, in the target directory, at each level (for example, an FID of the subdirectory at each level) and a file (for example, an FID of the file) in the target directory. In step 14, the correspondence between the FID of the target directory and the delete flag is recorded. In step 15, the correspondence between the user ID and the target directory is recorded. Therefore, association information (the FID of the target directory, the user ID, and the delete flag) may be formed.

Step 16: After receiving the create request success response message, the client sends a delete instruction to the storage server, where the delete instruction carries an FID. Further, the delete instruction may be a setinfo request, the setinfo request carries the FID and "delete on close", "delete on close" is a delete instruction, and the FID indicates the directory that needs to be deleted.

Step 17: After receiving the delete instruction, the storage server uses the FID to search for the target directory, and starts a delete thread to delete the target directory.

Deleting the target directory includes deleting all directories and all files in the target directory. After all the directories and all the files in the target directory are deleted, the target directory is deleted. Therefore, in this step, a deletion test may be performed on each directory and each file in the target directory. A directory or a file that passes the test is deleted, and a directory or a file that does not pass the test is not deleted.

For a directory, a delete operation is not performed on a non-empty directory. That is, when a directory has a lower-level file or a lower-level directory, a delete operation is not performed on the directory. An empty directory can be deleted. That is, a delete operation can be performed on a directory that has no lower-level file or lower-level directory.

A delete operation can be performed on a file in any case. That is, a delete operation may be performed starting from a file and a directory that has no lower-level file or lower-level directory.

The test includes the following: (1) A pre-stored user ID is obtained from the storage server, authentication is performed on a file or a directory using the user ID, it is determined whether a user represented by the user ID has permission to delete the file or the directory, and if a user represented by the user ID has the permission, the file or the directory passes the test. (2) Optionally, it is further determined whether a file or a directory has a create operation flag, and if the file or the directory does not have a create operation flag, the file or the directory passes the test.

A file or a directory that passes the foregoing two tests can be deleted, and a file or a directory that fails either test is not deleted.

If multiple threads are started, each thread may delete one directory or one file, or each thread may delete multiple directories or multiple files.

It should be noted that in the foregoing procedures, the client may make no modification and still use the other approaches manner. This is more convenient to be compatible with an existing client, without a need to change a habit of a user. Therefore, the client may use the other approaches to send a delete request to the storage server for a subdirectory and a file in the target subdirectory one by one. The following uses the subdirectory as an example to describe a processing manner of the storage server in this case.

(1) When the storage server receives a delete request, and the subdirectory is being deleted or deletion of the subdirectory has not started, the storage server deletes the subdirectory in the other approaches manner.

(2) When the storage server receives a delete request, and the subdirectory has been deleted and cannot be identified, the storage server returns a response message indicating that the subdirectory is not identified to the host. The response message carries a code STATUS_OBJECT_NAME_NOT_IDENTIFIED.

Figure 3:
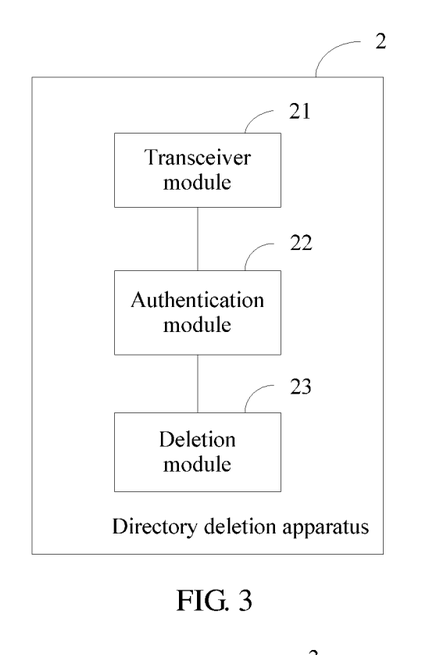
FIG. 3 is a structural diagram of an embodiment of a directory deletion apparatus according to this application.

Referring to FIG. 3, the present disclosure further provides a directory deletion apparatus 2 that can execute the foregoing method. The method has been described above in detail, and therefore, only simple descriptions are provided herein. The directory deletion apparatus 2 includes a transceiver module 21, an authentication module 22, and a deletion module 23.

The transceiver module 21 is configured to receive a delete operation authentication request of a host. The delete operation authentication request carries user information and information about a target directory.

The authentication module 22 is configured to detect the user information, and after detecting that a user represented by the user information has delete permission for the target directory, obtain an FID of the target directory according to the information about the target directory, and send a success response message to the host. The success response message carries the FID.

The transceiver module 21 is further configured to receive a delete request of the host. The delete request carries the FID.

The deletion module 23 is configured to, after the transceiver module 21 receives the delete request, identify the target directory using the FID, and perform a delete operation on a file and a subdirectory in the target directory. The delete operation includes performing verification on the file and the subdirectory using the user information stored by the storage server, and deleting a successfully verified empty subdirectory and a successfully verified file.

The authentication module 22 is further configured to, before the success response message is sent, detect whether a delete flag is set for the target directory, and after detecting that a delete flag is not set for the target directory, set a delete flag for the target directory.

The authentication module 22 is further configured to, before the success response message is sent, detect whether a create operation flag is set for the target directory, and after detecting that a create operation flag is not set for the target directory, set a create operation flag for the target directory.

The authentication module 22 is further configured to send a failure response message to the host after detecting that a create operation flag has been set for the target directory.

Performing, by the deletion module 23, a delete operation on a file and a subdirectory in the target directory includes starting, by the deletion module 23, multiple threads to perform the delete operation, where each thread deletes at least one file or at least one subdirectory.

The authentication module 22 is further configured to, when it is detected that a directory or a file that a next delete operation authentication request requests to delete has been successfully deleted by the thread, feedback a response indicating that the directory or the file is not identified to the host.

Figure 4:
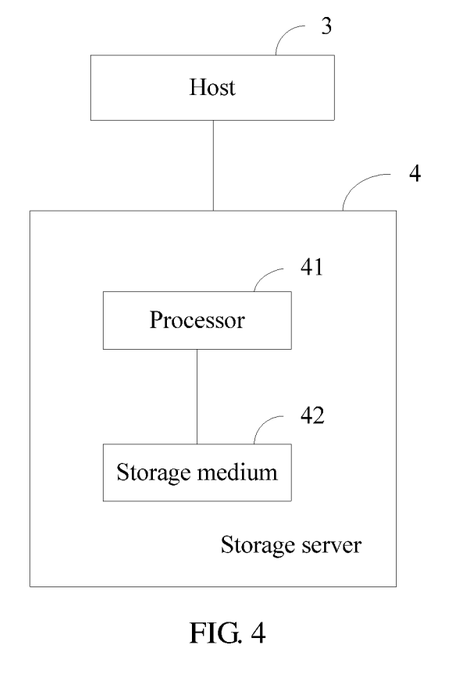
FIG. 4 is structural diagram of an implementation of a storage system according to this application.

Referring to FIG. 4, FIG. 4 is an implementation of a storage system in the present disclosure. A storage server 4 communicates with a host 3, and the storage server 4 includes a processor 41 and a storage medium 42. The processor is configured to perform the foregoing method. The storage medium 42 is configured to provide storage space for a target directory, and a file and a subdirectory in the target directory. The processor 41 is, for example, a central processing unit (CPU), and the CPU performs the foregoing method by running a program in a memory. The processor 41 may be a chip such as a field-programmable gate array (FPGA) that can perform the foregoing method without a memory. The storage medium 42 is, for example, a non-volatile storage medium such as a magnetic disk or a solid-state drive. In some cases, the storage medium 42 may be a volatile storage medium.

In combination with the examples described in the embodiments disclosed in this specification, units and algorithm steps may be implemented by electronic hardware or a combination of computer software and electronic hardware. Whether the functions are performed by hardware or software depends on particular application and design constraint conditions of the technical solutions. A person skilled in the art can implement the described functions using different methods with regard to each specific application.

What is claimed is:

1. A directory deletion method, comprising:
receiving, by a network attached storage (NAS) server, a first delete request of a host, wherein the first delete request identifies a directory of the NAS server;
locally pre-storing, by the NAS server in response to receiving the first delete request of the host, a correspondence between a user identifier and both a target directory and subdirectories in the target directory;
receiving, by the NAS server, a delete operation authentication request from the host, wherein the delete operation authentication request comprises user information and information about the target directory, wherein the user information comprises the user identifier or a user group identifier, and wherein the information about the target directory comprises a file name of the target directory and directory path information of the target directory;
obtaining, by the NAS server, a file identifier (FID) of the target directory according to the correspondence and the information about the target directory when a user represented by the user information has delete permission for the target directory;
storing, by the NAS server, the user information;
sending, by the NAS server, a success response message to the host, wherein the success response message carries the FID;
receiving, by the NAS server, a second delete request of the host, wherein the second delete request comprises the FID and does not comprise the user identifier;
identifying, by the NAS server, the target directory using the FID; and
performing, by the NAS server in response to receiving the second delete request of the host, a delete operation on a file and the subdirectories in the target directory, wherein the delete operation comprises:
performing, by the NAS server, verification on the file and the subdirectories using the user information stored by the NAS server; and deleting, by the NAS server, the file and the subdirectories after the file and the subdirectories are verified.

2. The directory deletion method of claim 1, wherein storing the correspondence comprises storing the correspondence in the target directory and in each level in the target directory, and wherein before sending the success response message, the directory deletion method further comprises:
detecting, by the NAS server, that a delete flag is not set for the target directory; and
setting, by the NAS server, the delete flag for the target directory.

3. The directory deletion method of claim 1, wherein before sending the success response message, the directory deletion method further comprises:
detecting, by the NAS server, that a create operation flag is not set for the target directory; and
setting, by the NAS server, the create operation flag for the target directory.

4. The directory deletion method of claim 1, wherein a create operation flag has been set for the target directory, and wherein the directory deletion method further comprises sending a failure response message to the host.

5. The directory deletion method of claim 1, wherein performing the delete operation on the file and the subdirectories in the target directory comprises starting, by the NAS server, a plurality of threads to perform the delete operation, and wherein each thread deletes at least one file.

6. The directory deletion method of claim 1, wherein performing the delete operation on the file and the subdirectories in the target directory comprises starting, by the NAS server, a plurality of threads to perform the delete operation, and wherein each thread deletes at least one of the subdirectories.

7. The directory deletion method of claim 5, wherein a file that a next delete operation authentication request requests to delete has been successfully deleted by a corresponding thread, and wherein the directory deletion method further comprises:
receiving, by the NAS server, a next delete operation authentication request of the host; and
sending, by the NAS server, a response to the host indicating that the file that the next delete operation authentication request requests to delete is not identified.

8. The directory deletion method of claim 6, wherein a directory that a next delete operation authentication request requests to delete has been successfully deleted by a corresponding thread, and wherein the directory deletion method further comprises:
receiving, by the NAS server, a next delete operation authentication request of the host; and
sending, by the NAS server, a response to the host indicating that the directory that the next delete operation authentication request requests to delete is not identified.

9. A network attached storage (NAS) server, comprising:
a storage medium configured to store instructions; and
a processor coupled to the storage medium, wherein the instructions cause the processor to be configured to:
receive a first delete request of a host, wherein the first delete request identifies a directory of the NAS server;
locally pre-store, in response to receiving the first delete request of the host, a correspondence between a user identifier and both a target directory and subdirectories in the target directory;
receive a delete operation authentication request from the host, wherein the delete operation authentication request comprises user information and information about the target directory, wherein the user information comprises the user identifier or a user group identifier, and wherein the information about the target directory comprises a file name of the target directory and directory path information of the target directory;
obtain a file identifier (FID) of the target directory according to the correspondence and the information about the target directory when a user represented by the user information has delete permission for the target directory;
send a success response message to the host, wherein the success response message carries the FID;
store the user information in the storage medium;
receive a second delete request of the host, wherein the second delete request comprises the FID and does not comprise the user identifier;
identify the target directory using the FID; and
perform, in response to receiving the second delete request of the host, a delete operation on a file and the subdirectories in the target directory, wherein the delete operation comprises:
performing verification on the file and the subdirectories using the user information in the storage medium; and
deleting the file and the subdirectories after the file and the subdirectories are verified.

10. The NAS server of claim 9, wherein the instructions further cause the processor to be configured to store the correspondence by storing the correspondence in the target directory and in each level in the target directory, wherein a delete flag is not set for the target directory, and wherein the instructions further cause the processor to be configured to set the delete flag for the target directory.

11. The NAS server of claim 9, wherein a create operation flag is not set for the target directory, and wherein the instructions further cause the processor to be configured to set the create operation flag for the target directory.

12. The NAS server of claim 9, wherein a create operation flag has been set for the target directory, and wherein the instructions further cause the processor to be configured to send a failure response message to the host.

13. The NAS server of claim 9, wherein in a manner of performing the delete operation on the file and the subdirectories in the target directory, the instructions further cause the processor to be configured to start a plurality of threads to perform the delete operation, and wherein each thread deletes at least one file.

14. The NAS server of claim 9, wherein in a manner of performing the delete operation on the file and the subdirectories in the target directory, the instructions further cause the processor to be configured to start a plurality of threads to perform the delete operation, and wherein each thread deletes at least one of the subdirectories.

15. The NAS server of claim 13, wherein a file that a next delete operation authentication request requests to delete has been successfully deleted by a corresponding thread, and wherein the instructions further cause the processor to be configured to:
receive a next delete operation authentication request of the host; and
send a response to the host indicating that the file that the next delete operation authentication request requests is not identified.

16. The NAS server of claim 14, wherein a directory that a next delete operation authentication request requests to delete has been successfully deleted by a corresponding thread, and wherein the instructions further cause the processor to be configured to:

receive a next delete operation authentication request of the host; and     send a response to the host indicating that the directory that the next delete operation authentication request requests is not identified.

17. The directory deletion method of claim 1, wherein the directory path information of the target directory comprises an upper-level directory of the target directory.

18. The directory deletion method of claim 1, wherein the file and the subdirectories are deleted concurrently in a background of an operating system.

19. The directory deletion method of claim 1, wherein the delete operation comprises performing, by the NAS server, a two-part deletion test on the file and the subdirectories by:

authenticating the user using the user identifier pre-stored on the NAS server; and     determining whether the file or the subdirectories comprise a create operation flag.

20. The directory deletion method of claim 1, wherein the NAS server is configured to communicate with the host using Common Internet File System (CIFS) protocol.

\* \* \* \* \*